United States Patent

Wojcikowski

[11] 4,317,388
[45] Mar. 2, 1982

[54] GEAR WHEEL WITH VIBRATION DAMPING RINGS

[75] Inventor: Richard J. Wojcikowski, Toledo, Ohio

[73] Assignee: Dana Corporation, Toledo, Ohio

[21] Appl. No.: 55,460

[22] Filed: Jul. 6, 1979

[51] Int. Cl.³ .......... F16F 15/10; F16H 55/17
[52] U.S. Cl. .......... 74/574; 74/443; 74/460
[58] Field of Search .......... 74/574, 572, 573 R, 74/230.11, 230.13, 439, 440, 443, 411, 414, 460; 64/6, 11 R, 11 F, 12, 27; 474/152, 162; 403/367, 368, 371, 374, 366

[56] References Cited

U.S. PATENT DOCUMENTS

| | | | |
|---|---|---|---|
| 228,430 | 6/1880 | Woodbury | 74/443 X |
| 1,424,203 | 8/1922 | Keller | 74/414 |
| 1,830,600 | 11/1931 | Fifield | 74/574 |
| 1,852,538 | 4/1932 | Peterson | 74/443 |
| 1,852,789 | 4/1932 | Peterson | 74/443 |
| 2,605,132 | 7/1952 | Watter | 74/443 X |
| 2,910,315 | 10/1959 | Stevens | 403/367 |
| 3,168,836 | 2/1965 | Militana | 474/152 |
| 3,200,485 | 8/1965 | McGavern, Jr. | 74/574 X |
| 3,320,824 | 5/1967 | Riley, Jr. et al. | 74/443 |
| 3,323,817 | 6/1967 | Hollyday | 403/367 |
| 3,407,627 | 10/1968 | Lätsch et al. | 64/11 R |
| 3,439,551 | 4/1969 | Militana | 474/162 |
| 3,477,246 | 11/1969 | Martin | 64/11 R |
| 3,993,356 | 11/1976 | Giroff et al. | 74/443 X |
| 4,044,627 | 8/1977 | Zander | 74/574 |
| 4,174,643 | 11/1979 | Tsukamoto | 74/574 X |

OTHER PUBLICATIONS

A.P.C. Application of R. R. R. Sarazin, Ser. No. 455,908, published 6/1/1943.

Primary Examiner—Allan D. Herrmann
Attorney, Agent, or Firm—Wilson, Fraser, Barker & Clemens

[57] ABSTRACT

A gear wheel is provided with a split damping ring on each side having a close fit with the inside of the rim of the gear wheel. The rings are anchored at points remote from their split ends to the web of the wheel. A tapered bolt and nut assembly cooperate to wedge the rings against the gear rim. Elastomer type ring washers associated with such bolt and nut assembly are pinched tightly thereby to the gear rim.

9 Claims, 3 Drawing Figures

U.S. Patent  Mar. 2, 1982  4,317,388
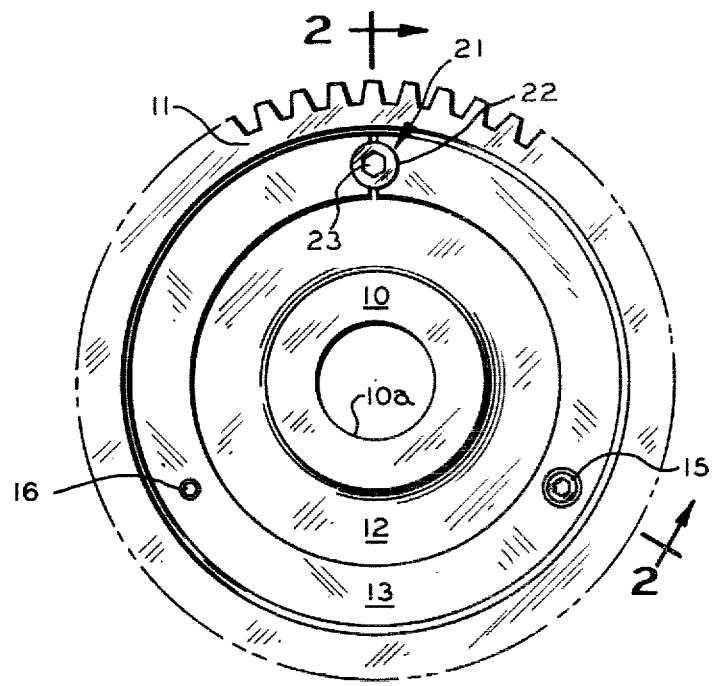
FIG. 1
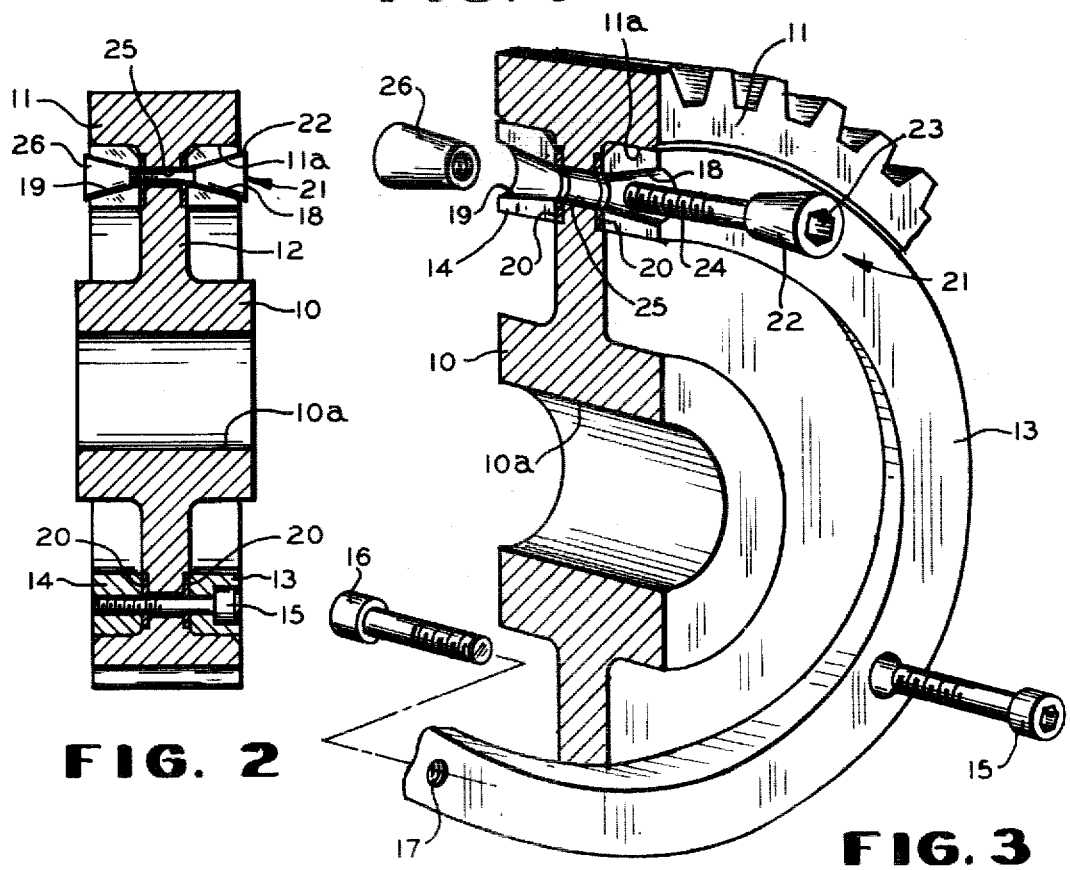
FIG. 2
FIG. 3

GEAR WHEEL WITH VIBRATION DAMPING RINGS

BACKGROUND OF THE INVENTION

This invention is concerned with torque transmitting devices and particularly gear wheels which create objectionable vibration and noises when in operation.

It is known that objectionable vibrations in gear wheels may be prevented or reduced by applying rings of a material other than that of the gear rim. Cast iron has been used for such rings, which are applied to steel gear wheels. Although this expedient has had a measure of success, they have been too costly and time consuming to produce on a practical and commercial basis, and have failed to reduce the vibrations and silence the noise in a satisfactory manner.

An object of this invention is to produce a gear wheel which is relatively quiet in operation and can be produced economically and efficiently.

SUMMARY OF THE INVENTION

The invention provides a gear wheel equipped with a split damping ring on each side, which has a close clearance fit with the internal diameter of the gear rim. The wheels are anchored at regions remote from their split ends. Tapered bolt and nut assemblies cooperate with tapered holes in the damping rings to effect spreading of the rings circumferentially against the internal surface of the gear rim, thereby causing the rim to go into a tensile stress condition. Elastomer type ring washers are pinched by the tapered bolt and nut assembly and the associated split rings tightly to the rim of the gear and dampen the stress wave propagating propagating from the rim radially to its axis.

BRIEF DESCRIPTION OF THE DRAWINGS

FIG. 1 is a plan view of the gear wheel and showing one of the damping rings;

FIG. 2 is a sectional view taken on the lines 2—2 of FIG. 1; and

FIG. 3 is an enlarged fragmentary sectional perspective view showing particularly the tapered bolt and tapered nut arrangement with respect to the ends of the split damping rings.

DESCRIPTION OF PREFERRED EMBODIMENT

With reference to the drawings, there is illustrated a gear wheel having a central portion provided with a hub 10 having a central shaft receiving opening 10a and a gear rim 11, which has an annular inner surface 11a. The hub 10 and the gear rim 11 are integrally connected by a web portion 12 disposed in the central transverse plane of the wheel. Ordinarily, the gear wheel is forged from a single piece of steel or machined from a solid steel block.

Damping rings 13 and 14 of cast iron or sand cast porous aluminum, for example, are disposed on opposite sides of the gear wheel. Each ring is generally C shaped or split, as shown on FIG. 1. The outside diameter or rim of each ring 13 and 14 affords a close clearance fit with the inside surface 11a of the gear rim and the inner face of each ring abuts or is in close juxtaposition to the adjacent side of the web 12. If desired, the web 12 may be channeled to receive the rings. The outer face of the rings 13 and 14 is flush with or extends slightly beyond the outside of the gear rim 11.

Two socket head threaded fasteners 15 and 16 are employed for holding the damping rings 13 and 14 in place. Typically, the fasteners 15 and 16 are spaced apart 120°. One screw engages a thread in one ring while the other screw engages a thread in the opposite ring, the screws passing through clearance holes in the web 12.

At the split ends of the damping rings 13 and 14 are tapered holes 18 and 19, respectively, the wider end of each hole being outermost. A portion of each hole 18 and 19 is formed in each adjacent end of the respective ring. Surrounding each hole, and between the split ring ends is a similarly shaped elastomeric ring washer 20 of an elastic rubber-type polymer, for example. Fitting one of the tapered holes is a bolt 21 having a tapered head 22, which is provided with a wrench-receiving socket 23. The shank of the bolt 21 extends through a clearance hole 25 in the web 12 and has a screw threaded end to receive a nut 26 tapered to conform to the adjacent opening in the ring ends.

By tightening the tapered bolt and nut assembly, the rings 13 and 14 are concurrently cammed outwardly due to the cooperative wedging action to effect pressure circumferentially against the gear rim 11 for causing it to go into a tensile stress condition. Thus, if the tooth to tooth impact of meshing gears occurs, the sudden rise bending stress is canceled by the internal prestressed condition. In addition, the contact surfaces of the rings 13 and 14 extend to or beyond the rim edge, thereby damping the vibration and noise that would be transmitted to the air medium perpendicular to the edge of the rim 11.

It will be understood that the damping rings clamp the web 12 through the elastomeric washers 20, thereby damping the stress wave passing from the rim 11 downwardly into the web 12 and into the shaft on which the gear wheel is mounted. Thus, the tapered bolt and nut assembly not only spreads the clamping rings 13 and 14 circumferentially against the inside diameter surface of the gear rim, but also pinches the elastomeric washers 20 tightly against the surface of the web 12. The amount of damping can be tuned or regulated at the gear rim by the pressure exerted by the tapered bolt and nut assembly and the retaining bolts 15 and 16.

The clamping rings 13 and 14, wedged against the gear rim 11, are moveable axially and are also restrained by the rim 11 from radial movement. The rim 11 is thereby loaded outwardly by the cooperation of the rings 13 and 14, and the associated wedging tapered bolt and nut assembly. The vibrational motion of the gear wheel is inhibited laterally by the above-mentioned frictional resistance and the cooperative effect of the elastomeric washers 20. It must be understood that the objectives of the invention are achieved, in large part, by the fact that the rings 13 and 14, tapered bolt and nut assembly, and the elastomeric washers are not integral with the gear wheel structure, per se; and thereby, function to dampen the undesired vibrational motions.

The above description and drawings are by way of example and it is to be understood that changes can be made without departing from the spirit of the invention. The invention is not regarded as being limited to the illustrated embodiment except insofar as the claims may be so limited.

What is claimed is:

1. A gear wheel comprising: a hub; a toothed rim, including an inner annular surface facing radially inwardly; a web integrally connecting said hub and said rim; a split ring terminating in two closely spaced opposing ends and in engagement with said inner annular surface of said rim; and adjustable wedge means between the ends of said split ring for expanding said split ring, thereby exerting outward pressure on said rim to cause same to go into tensile stress.

2. A gear wheel as defined in claim 1, including elastomeric annular damping means disposed between said web and said ring.

3. A gear wheel as defined in claim 1, including securing means for said ring remote from the split in said ring.

4. A gear wheel as defined in claim 1, including similarly arranged split rings on opposite sides of said web; and a tapered bolt and tapered nut assembly engaging respectively at the split ends of said rings.

5. A gear wheel as defined in claim 4, including securing means common to said split rings and disposed remote from the split ends thereof.

6. A gear wheel comprising: a hub; a rim, said rim having an inner annular surface facing radially inward; a web integrally connecting said hub and said rim; a discontinuous annulus on each side of said web in engagement with the inner surface of said rim; wedge means common to the annuli and engaging same at the ends thereof for exerting regulated pressure against the said inner surface of said rim; spaced fasteners for securing said annuli to said web; and annular elastomeric damping means compressed between said web and each of said discontinuous annuli.

7. A gear wheel as defined in claim 6 wherein the adjacent ends of each annulus have outwardly tapered holes aligned with a hole in said web; said wedge means including a tapered bolt fitting one of the holes and having a threaded shank extending through the web hole; and a tapered nut on the threaded shank of said tapered bolt fitting the other hole; whereby tightening said tapered bolt expands said discontinuous annuli and compresses said elastomeric washer.

8. A gear wheel as defined in claim 6 wherein said discontinuous annuli are formed of cast iron.

9. A gear wheel as defined in claim 6 wherein said discontinuous annuli are formed of aluminum.

* * * * *